(12) United States Patent
Nomaru

(10) Patent No.: US 8,941,030 B2
(45) Date of Patent: Jan. 27, 2015

(54) LASER PROCESSING APPARATUS

(75) Inventor: Keiji Nomaru, Ota-Ku (JP)

(73) Assignee: Disco Corporation, Tokyo (JP)

( * ) Notice: Subject to any disclaimer, the term of this patent is extended or adjusted under 35 U.S.C. 154(b) by 314 days.

(21) Appl. No.: 13/614,073

(22) Filed: Sep. 13, 2012

(65) Prior Publication Data
US 2013/0068740 A1 Mar. 21, 2013

(30) Foreign Application Priority Data
Sep. 15, 2011 (JP) .................... 2011-201900

(51) Int. Cl.
| | | |
|---|---|---|
| B23K 26/02 | (2014.01) | |
| B23K 26/08 | (2014.01) | |
| B23K 26/04 | (2014.01) | |
| B23K 26/06 | (2014.01) | |
| B41J 2/16 | (2006.01) | |
| B41J 2/465 | (2006.01) | |

(52) U.S. Cl.
CPC ............... *B23K 26/04* (2013.01); *B23K 26/08* (2013.01); *B23K 26/02* (2013.01); *B23K 26/063* (2013.01); *B23K 26/0853* (2013.01); *B23K 26/0876* (2013.01); *B23K 2201/40* (2013.01); *B41J 2/1634* (2013.01); *B41J 2/465* (2013.01)
USPC ................... 219/121.78; 219/121.68

(58) Field of Classification Search
CPC ................. B23K 26/02; B23K 26/08
USPC ............ 219/121.61–121.72, 121.78, 121.82, 219/121.85
See application file for complete search history.

(56) References Cited

U.S. PATENT DOCUMENTS

| | | | | |
|---|---|---|---|---|
| 5,834,644 | A * | 11/1998 | Shao et al. ...................... | 73/105 |
| 8,072,855 | B2 * | 12/2011 | Ueda ............................. | 369/47.5 |
| 8,124,909 | B2 * | 2/2012 | Sawabe et al. ........... | 219/121.67 |
| 8,389,893 | B2 * | 3/2013 | Kempe et al. ............ | 219/121.72 |

FOREIGN PATENT DOCUMENTS

JP      2010-221527      10/2010

* cited by examiner

*Primary Examiner* — Samuel M Heinrich
(74) *Attorney, Agent, or Firm* — Greer Burns & Crain, Ltd.

(57) ABSTRACT

A pulsed laser beam is applied to a workpiece held on a chuck table by a laser beam applying unit. The laser beam applying unit includes a pulsed laser beam oscillator, a focusing lens, and a piezoelectric motor for displacing the focusing unit in a direction inclined at a predetermined angle ($\alpha$) with respect to the Z direction. A controller controls the frequency and voltage of an RF current to be applied to the piezoelectric motor in relation to the repetition frequency of the pulsed laser beam to move the focusing unit in the X direction by $\Delta x$ and in the Z direction by $\Delta z$ in feeding the chuck table in the X direction, thereby displacing the focal point of the pulsed laser beam to be focused by the focusing lens in the thickness direction of the workpiece held on the chuck table.

4 Claims, 11 Drawing Sheets

LASER PROCESSING APPARATUS

BACKGROUND OF THE INVENTION

1. Field of the Invention

The present invention relates to a laser processing apparatus for applying a pulsed laser beam having a transmission wavelength to a workpiece held on a chuck table moving in a feeding direction, thereby forming a modified layer inside the workpiece.

2. Description of the Related Art

A silicon reservoir substrate is connected to a nozzle substrate having a plurality of nozzles for discharging ink, which constitute a so-called inkjet head. The silicon reservoir substrate is formed with a plurality of through holes respectively communicating with the plural nozzles of the nozzle substrate. In forming the plural through holes in the silicon reservoir substrate, the front side of the silicon reservoir substrate is first covered with an etching mask having a plurality of openings respectively corresponding to hole forming areas where the through holes are to be formed. Thereafter, a pulsed laser beam having a transmission wavelength to the silicon reservoir substrate is applied through the openings of the etching mask to the silicon reservoir substrate, thereby forming a plurality of modified layers inside the silicon reservoir substrate at the hole forming areas. Thereafter, an etching liquid is supplied through the openings of the etching mask to the silicon reservoir substrate, thereby making the etching liquid penetrate into the silicon reservoir substrate along the modified layers. Thus, the proper through holes each having a diameter of 5 to 15 µm are formed in the silicon reservoir substrate (see Japanese Patent Laid-open No. 2010-221527, for example).

SUMMARY OF THE INVENTION

The thickness of the modified layer to be formed by one shot of the pulsed laser beam is about 20 to 30 µm. Accordingly, in the case that the thickness of the silicon reservoir substrate is 200 µm, for example, ten or more shots of the pulsed laser beam must be applied to form the modified layer having a thickness ranging from the front side to the back side of the silicon reservoir substrate. As a result, the silicon reservoir substrate as a workpiece must be stopped at a pulsed laser beam applying position in performing laser processing intermittently, causing a reduction in productivity.

It is therefore an object of the present invention to provide a laser processing apparatus which can apply a plurality of shots of a pulsed laser beam to a workpiece in the thickness direction thereof as feeding the workpiece.

In accordance with an aspect of the present invention, there is provided a laser processing apparatus including a chuck table for holding a workpiece; laser beam applying means for applying a pulsed laser beam having a transmission wavelength to the workpiece held on the chuck table; feeding means for relatively moving the chuck table and the laser beam applying means in a feeding direction (X direction); X position detecting means for detecting the X position of the chuck table fed by the feeding means; and control means for controlling the laser beam applying means according to a detection signal from the X position detecting means. The laser beam applying means includes pulsed laser beam oscillating means for oscillating the pulsed laser beam, focusing means having a focusing lens for focusing the pulsed laser beam oscillated by the pulsed laser beam oscillating means and applying the pulsed laser beam to the workpiece held on the chuck table, and a piezoelectric motor for displacing the focusing means in a direction inclined at a predetermined angle ($\alpha$) with respect to the optical axis of the focusing lens (Z direction). The control means controls the frequency and voltage of an RF current to be applied to the piezoelectric motor in relation to the repetition frequency of the pulsed laser beam to move the focusing means in the X direction by $\Delta x$ and in the Z direction by $\Delta z$ in feeding the chuck table in the X direction, thereby displacing the focal point of the pulsed laser beam to be focused by the focusing lens in the thickness direction of a predetermined area of the workpiece held on the chuck table.

Preferably, the conditions of $(2 \times J \times H) \times \sin \alpha = V$, $\Delta x = V/F$, $(2 \times J \times H \times 1/F) \times \cos \alpha \leq h$, and $\Delta z = (2 \times J \times H \times 1/F) \times \cos \alpha$ are satisfied; where F (Hz) is the repetition frequency of the pulsed laser beam to be oscillated by the pulsed laser beam oscillating means, H (Hz) is the frequency of the RF current to be applied to the piezoelectric motor, J (µm) is the amplitude of the oscillation of the piezoelectric motor produced by the voltage to be applied to the piezoelectric motor, V (µm/s) is the feed speed of the chuck table to be fed by the feeding means, and h (µm) is the thickness of a modified layer to be formed by one shot of the pulsed laser beam. More preferably, the condition of $H \leq F/2n$ is set in the case of applying n ($n \geq 2$) shots of the pulsed laser beam during the period of displacement from a lower position to an upper position of the focusing means in each oscillation cycle of the piezoelectric motor. Further, the condition of $H = V/A$ is set, where A is the spacing of subject areas in the workpiece to be processed.

In the laser processing apparatus according to the present invention, the frequency and voltage of an RF current to be applied to the piezoelectric motor for displacing the focusing means in a direction inclined at a predetermined angle ($\alpha$) with respect to the optical axis of the focusing lens (Z direction) in the XZ plane are controlled in relation to the repetition frequency of the pulsed laser beam to be oscillated by the pulsed laser beam oscillating means to move the focusing lens of the focusing means in the X direction by $\Delta x$ and in the Z direction by $\Delta z$ in feeding the chuck table in the X direction, thereby displacing the focal point of the pulsed laser beam to be focused by the focusing lens in the thickness direction of a predetermined area of the workpiece held on the chuck table. Accordingly, a plurality of modified layers can be formed in the thickness direction of the workpiece at a subject area set in the workpiece. As a result, the plural modified layers can be efficiently stacked at the subject area set in the workpiece, thereby improving the productivity.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
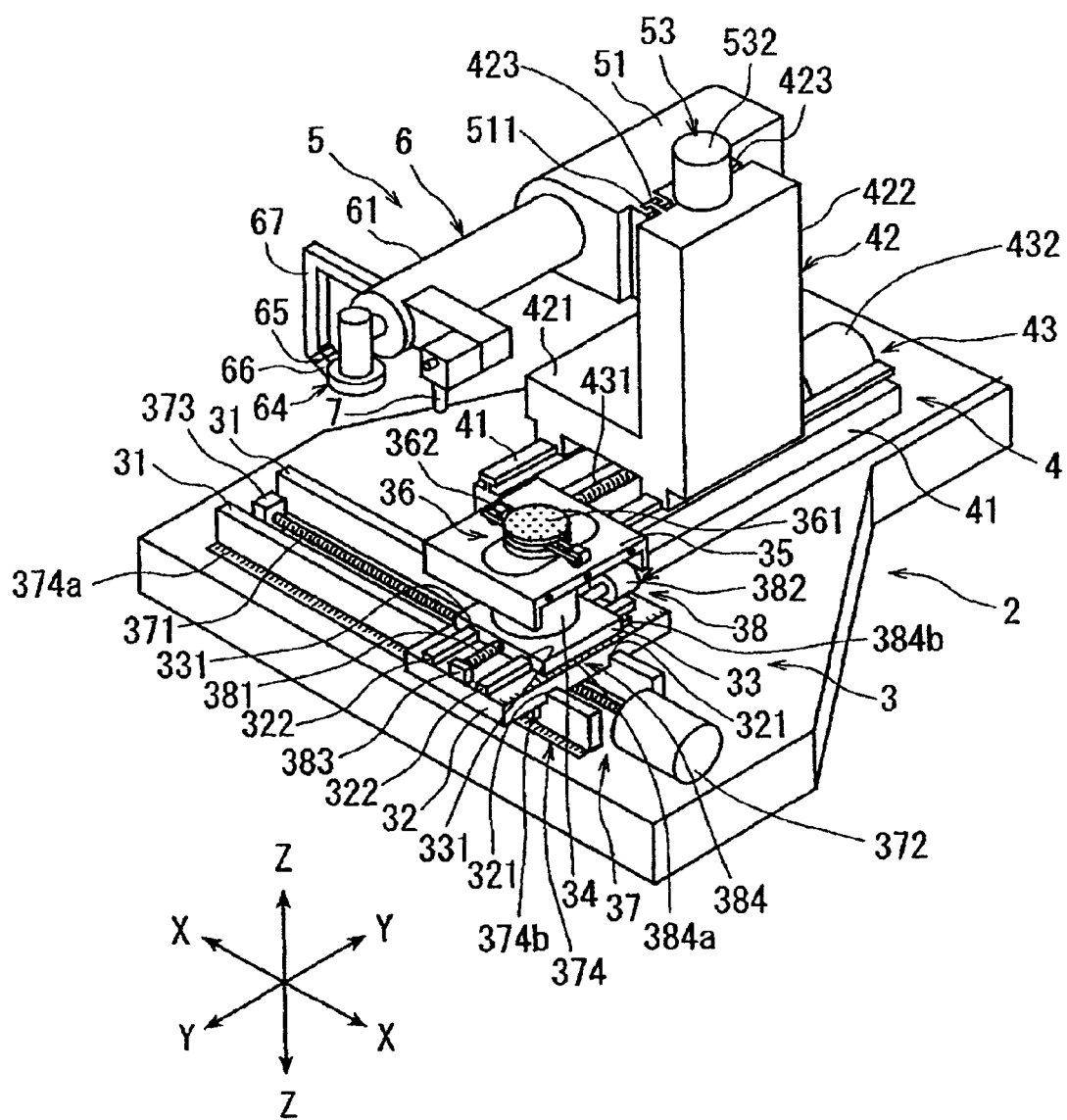
FIG. 1 is a perspective view of a laser processing apparatus according to the present invention.

A preferred embodiment of the laser processing apparatus according to the present invention will now be described in detail with reference to the attached drawings. FIG. 1 is a perspective view of a laser processing apparatus according to the present invention. The laser processing apparatus shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z.

The chuck table mechanism 3 includes a pair of guide rails 31, 31 provided on the stationary base 2 so as to extend parallel to each other in the X direction, a first slide block 32 provided on the guide rails 31, 31 so as to be movable in the X direction, a second slide block 33 provided on the first slide block 32 so as to be movable in the Y direction, a cover table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the upper surface (holding surface) of the vacuum chuck 361 by operating suction means (not shown). The chuck table 36 is rotatable by a pulse motor (not shown) provided in the cylindrical member 34. Further, the chuck table 36 is provided with clamps 362 for fixing an annular frame (to be hereinafter described).

The lower surface of the first slide block 32 is formed with a pair of guided grooves 321, 321 for slidably engaging the pair of guide rails 31, 31 mentioned above. A pair of guide rails 322, 322 are provided on the upper surface of the first slide block 32 so as to extend parallel to each other in the Y direction. Accordingly, the first slide block 32 is movable in the X direction along the guide rails 31, 31 by the slidable engagement of the guided grooves 321, 321 with the guide rails 31, 31. The chuck table mechanism 3 according to the embodiment further includes feeding means 37 for moving the first slide block 32 in the X direction along the guide rails 31, 31. The feeding means 37 includes an externally threaded rod 371 extending parallel to the guide rails 31, 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31, 31 by operating the pulse motor 372 to normally or reversely rotate the externally threaded rod 371.

The laser processing apparatus shown in FIG. 1 further includes X position detecting means 374 for detecting the feed amount, or X position of the chuck table 36. The X position detecting means 374 includes a linear scale 374a extending along one of the guide rails 31, 31 and a read head 374b provided on the first slide block 32 and movable along the linear scale 374a together with the first slide block 32. The read head 374b of the X position detecting means 374 transmits a pulse signal of one pulse every 1 μm in this preferred embodiment to control means which will be hereinafter described. This control means counts the number of pulses as the pulse signal input from the read head 374b to thereby detect the feed amount, or X position of the chuck table 36.

The lower surface of the second slide block 33 is formed with a pair of guided grooves 331, 331 for slidably engaging the pair of guide rails 322, 322 provided on the upper surface of the first slide block 32 as mentioned above. Accordingly, the second slide block 33 is movable in the Y direction along the guide rails 322, 322 by the slidable engagement of the guided grooves 331, 331 with the guide rails 322, 322. The chuck table mechanism 3 further includes first indexing means 38 for moving the second slide block 33 in the Y direction along the guide rails 322, 322 provided on the first slide block 32. The first indexing means 38 includes an externally threaded rod 381 extending parallel to the guide rails 322, 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322, 322 by operating the pulse motor 382 to normally or reversely rotate the externally threaded rod 381.

The laser processing apparatus shown in FIG. 1 further includes Y position detecting means 384 for detecting the index amount, or Y position of the chuck table 36. The Y position detecting means 384 includes a linear scale 384*a* extending along one of the guide rails 322, 322 and a read head 384*b* provided on the second slide block 33 and movable along the linear scale 384*a* together with the second slide block 33. The read head 384*b* of the Y position detecting means 384 transmits a pulse signal of one pulse every 1 μm in this preferred embodiment to the control means. The control means counts the number of pulses as the pulse signal input from the read head 384*b* to thereby detect the index amount, or Y position of the chuck table 36.

The laser beam applying unit supporting mechanism 4 includes a pair of guide rails 41, 41 provided on the stationary base 2 so as to extend parallel to each other in the Y direction and a movable support base 42 provided on the guide rails 41, 41 so as to be movable in the Y direction. The movable support base 42 is composed of a horizontal portion 421 slidably supported to the guide rails 41, 41 and a vertical portion 422 extending vertically upward from the upper surface of the horizontal portion 421. Further, a pair of guide rails 423, 423 are provided on one side surface of the vertical portion 422 so as to extend parallel to each other in the Z direction. The laser beam applying unit supporting mechanism 4 further includes second indexing means 43 for moving the movable support base 42 in the Y direction along the guide rails 41, 41. The second indexing means 43 includes an externally threaded rod 431 extending parallel to the guide rails 41, 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 configuring the movable support base 42 at a central portion thereof. Accordingly, the movable support base 42 is moved in the Y direction along the guide rails 41, 41 by operating the pulse motor 432 to normally or reversely rotate the externally threaded rod 431.

The laser beam applying unit 5 includes a unit holder 51 and laser beam applying means 6 mounted to the unit holder 51. The unit holder 51 is formed with a pair of guided grooves 511, 511 for slidably engaging the pair of guide rails 423, 423 provided on the vertical portion 422. Accordingly, the unit holder 51 is supported to the movable support base 42 so as to be movable in the Z direction by the slidable engagement of the guided grooves 511, 511 with the guide rails 423, 423.

The laser beam applying unit 5 further includes focal position adjusting means 53 for moving the unit holder 51 along the guide rails 423, 423 in the Z direction. The focal position adjusting means 53 includes an externally threaded rod (not shown) extending parallel to the guide rails 423, 423 so as to be interposed therebetween and a pulse motor 532 as a drive source for rotationally driving this externally threaded rod. Accordingly, the unit holder 51 and the laser beam applying means 6 are moved in the Z direction along the guide rails 423, 423 by operating the pulse motor 532 to normally or reversely rotate this externally threaded rod. In this preferred embodiment, when the pulse motor 532 is normally operated, the laser beam applying means 6 is moved upward, whereas when the pulse motor 532 is reversely operated, the laser beam applying means 6 is moved downward.

Figure 2:
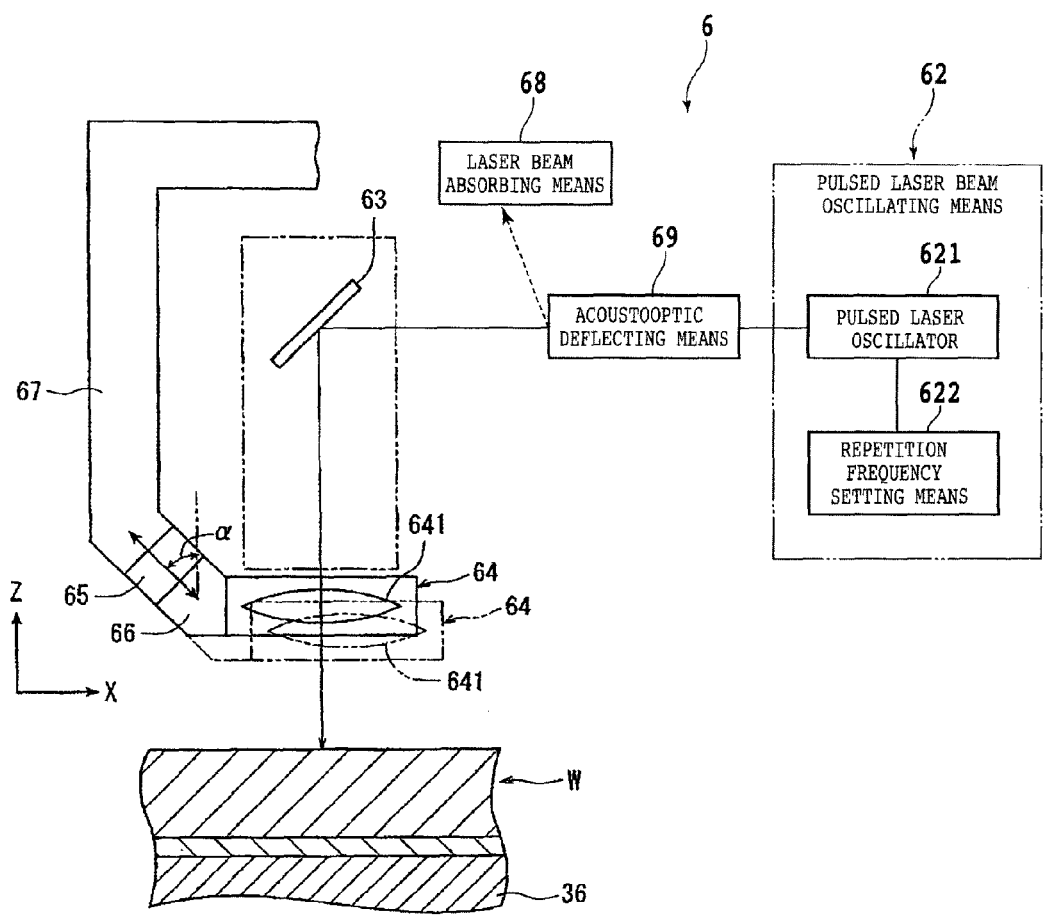
FIG. 2 is a block diagram showing the configuration of laser beam applying means included in the laser processing apparatus shown in FIG. 1.

The laser beam applying means 6 includes a cylindrical casing 61 fixed to the unit holder 51 so as to extend in a substantially horizontal direction. The configuration of the laser beam applying means 6 will now be described with reference to FIG. 2. The laser beam applying means 6 includes pulsed laser beam oscillating means 62 provided in the casing 61, a direction changing mirror 63 for changing the traveling direction of a pulsed laser beam oscillated by the pulsed laser beam oscillating means 62 toward the holding surface of the chuck table 36 (downwardly as viewed in FIG. 2), focusing means 64 having a focusing lens 641 for focusing the pulsed laser beam whose traveling direction has been changed by the direction changing mirror 63 and applying the pulsed laser beam to a workpiece W held on the chuck table 36, and a piezoelectric motor 65 for displacing the focusing means 64 in a direction inclined at a predetermined angle with respect to the optical axis of the focusing lens 641 (i.e., with respect to the Z direction) in the XZ plane.

The pulsed laser beam oscillating means 62 functions to oscillate a pulsed laser beam having a transmission wavelength to a wafer as the workpiece W. The pulsed laser beam oscillating means 62 is composed of a pulsed laser oscillator 621 such as a YVO4 pulsed laser oscillator or a YAG pulsed laser oscillator and repetition frequency setting means 622 connected to the pulsed laser oscillator 621. In the case that the workpiece W is formed from a silicon substrate, a silicon carbide substrate, or a lithium tantalate substrate, the pulsed laser oscillator 621 oscillates a pulsed laser beam having a wavelength of 1064 nm, for example.

Figure 3:
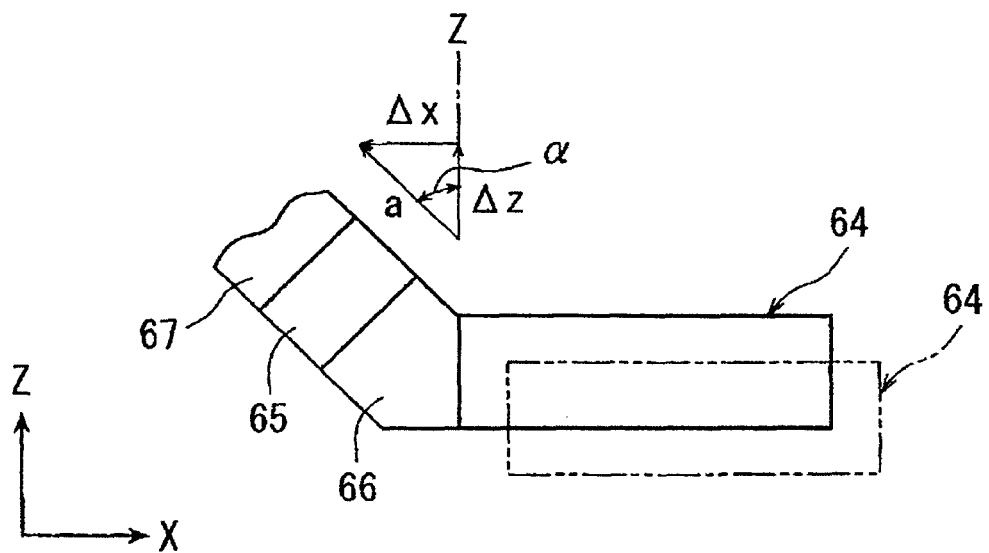
FIG. 3 is a diagram for illustrating the amount of displacement of focusing means by an RF current to be applied to a piezoelectric motor constituting the laser beam applying means shown in FIG. 2.
Figure 4:
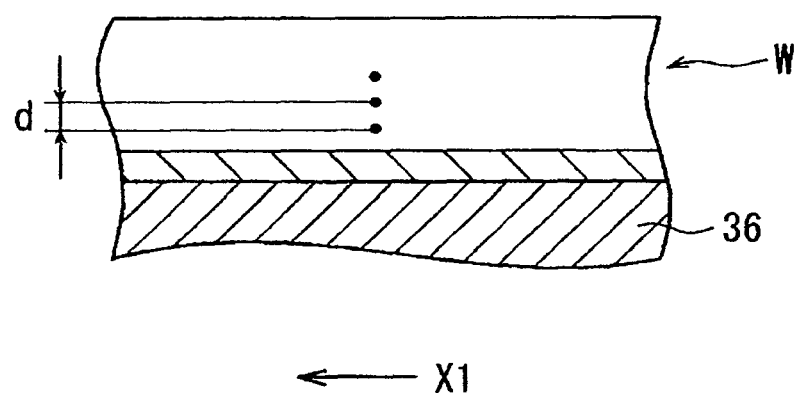
FIG. 4 is a diagram for illustrating the spacing between the adjacent shots of a pulsed laser beam to be applied to a workpiece held on a chuck table according to the displacement of the focusing means shown in FIG. 3.

The focusing means 64 includes the focusing lens 641 for focusing the pulsed laser beam whose traveling direction has been changed by the direction changing mirror 63. The piezoelectric motor 65 is configured by a piezoelectric element arranged to be oscillated in a direction inclined at a predetermined angle (α) with respect to the Z direction (the beam axis of the laser beam reflected by the mirror 63) according to a voltage of an RF (radio frequency) current applied. One side of the piezoelectric motor 65 is fixed to a mount member 66 for mounting the focusing means 64, and the other side of the piezoelectric motor 65 is fixed to a support member 67 mounted to the casing 61. Accordingly, when an RF current is applied to the piezoelectric motor 65, the focusing means 64 is oscillated (reciprocated) between a first position shown by a solid line in FIG. 2 and a second position shown by a two-dot chain line in FIG. 2, wherein the second position is shifted from the first position obliquely downward in the direction inclined at the predetermined angle (α) with respect to the Z direction. Accordingly, letting (a) denote the amount of displacement of the focusing means 64 in the direction inclined at the predetermined angle (α) with respect to the Z direction as shown in FIG. 3, the amount of displacement (Δx) of the focusing means 64 in the X direction is expressed as a×sin α, and the amount of displacement (Δz) of the focusing means 64 in the Z direction is expressed as a×cos α. Further, as shown in FIG. 4, the spacing (d) between the adjacent shots of the pulsed laser beam to be applied to the workpiece W is equal to a×cos α, i.e., Δz.

Referring again to FIG. 2, the laser beam applying means 6 further includes laser beam absorbing means 68 for absorbing the pulsed laser beam oscillated by the pulsed laser beam oscillating means 62 and acoustooptic deflecting means 69 for deflecting the laser beam oscillated by the pulsed laser beam oscillating means 62 toward the direction changing mirror 63 and the laser beam absorbing means 68. When a voltage of 5 V, for example, is applied from the control means to be described later to the acoustooptic deflecting means 69, the acoustooptic deflecting means 69 deflects the beam axis of the laser beam oscillated by the pulsed laser beam oscillating means 62 toward the direction changing mirror 63, whereas when a voltage of 0 V, for example, is applied from the control means to the acoustooptic deflecting means 69, the acoustooptic deflecting means 69 deflects the beam axis of the laser beam toward the laser beam absorbing means 68. Accordingly, the acoustooptic deflecting means 69 functions as light deflecting means for deflecting the laser beam oscillated by the pulsed laser beam oscillating means 62 toward the direction changing mirror 63 and the laser beam absorbing means 68.

Referring back to FIG. 1, the laser processing apparatus includes imaging means 7 provided at the front end portion of the casing 61 for imaging a subject area of the workpiece to be laser-processed by the laser beam applying means 6. The imaging means 7 includes an ordinary imaging device (CCD) for imaging the workpiece by using visible light, infrared light applying means for applying infrared light to the workpiece, an optical system for capturing the infrared light applied to the workpiece by the infrared light applying means, and an imaging device (infrared CCD) for outputting an electrical signal corresponding to the infrared light captured by the optical system. An image signal output from the imaging means 7 is transmitted to the control means 8 (see FIG. 5).

Figure 5:
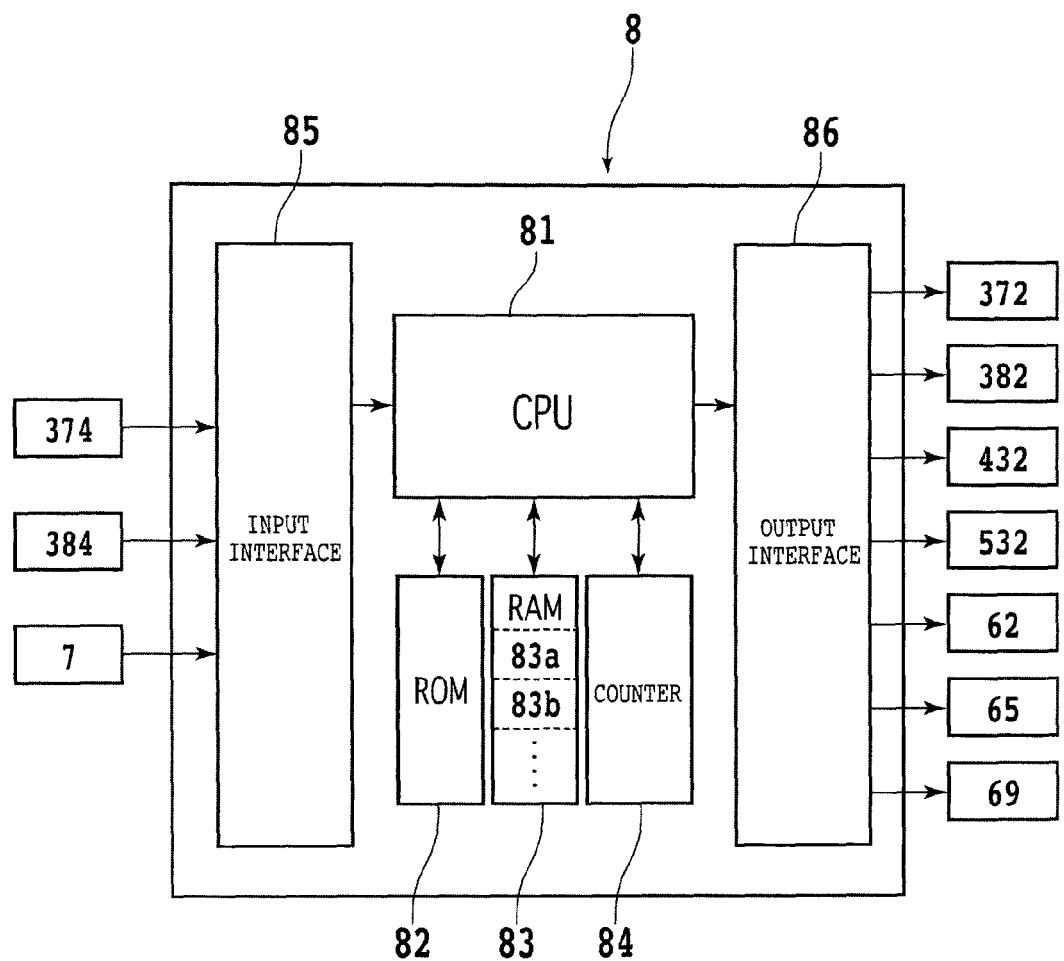
FIG. 5 is a block diagram showing the configuration of control means included in the laser processing apparatus shown in FIG. 1.

The laser processing apparatus includes the control means 8 shown in FIG. 5. The control means 8 is configured by a computer, and it includes a central processing unit (CPU) 81 for performing operational processing according to a control program, a read only memory (ROM) 82 preliminarily storing the control program, a random access memory (RAM) 83 for storing a control map to be described later, data on design value for the workpiece, the results of computation, etc., a counter 84, an input interface 85, and an output interface 86. Detection signals from the X position detecting means 374, the Y position detecting means 384, and the imaging means 7 are input into the input interface 85 of the control means 8. On the other hand, control signals are output from the output interface 86 of the control means 8 to the pulse motor 372, the pulse motor 382, the pulse motor 432, the pulse motor 532, the pulsed laser beam oscillating means 62, the piezoelectric motor 65, and the acoustooptic deflecting means 69. The random access memory (RAM) 83 includes a first memory area 83a for storing data on design value for a silicon reservoir substrate (which will be hereinafter described) as the workpiece, a second memory area 83b for storing feed start position coordinate values to be hereinafter described, and other memory areas.

Figure 6:
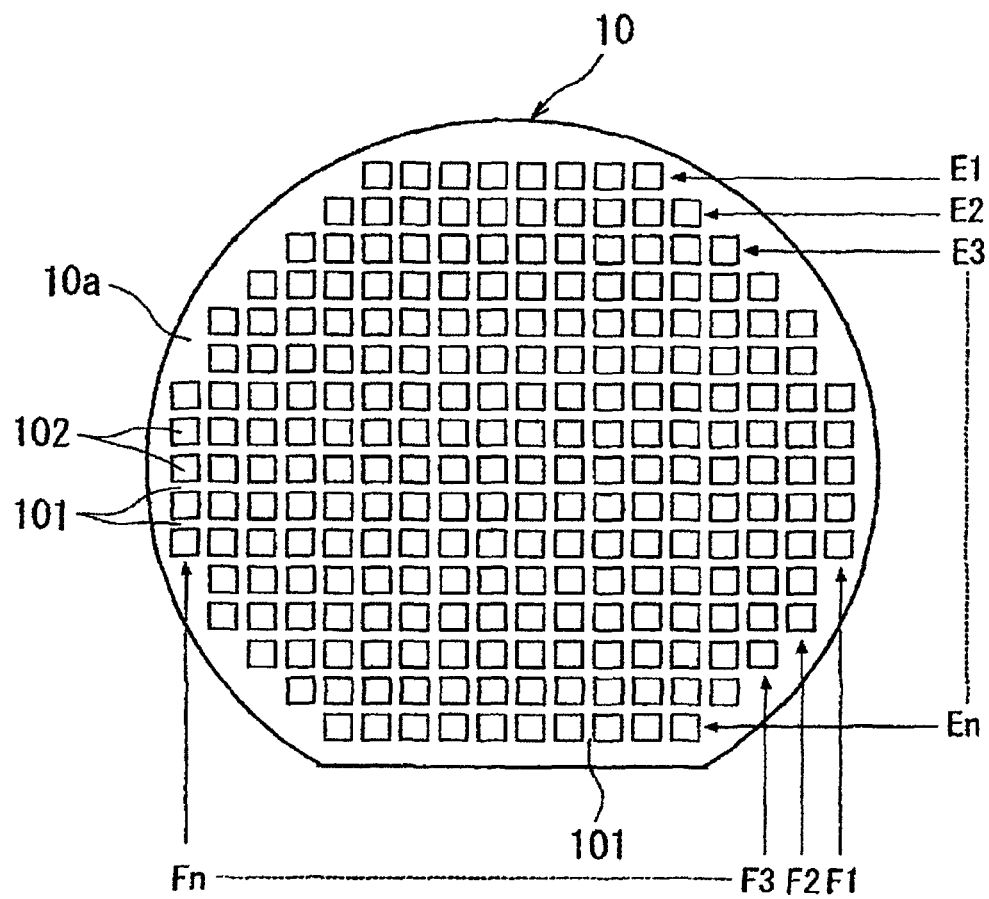
FIG. 6 is a plan view of a silicon reservoir substrate as the workpiece.
Figure 7:
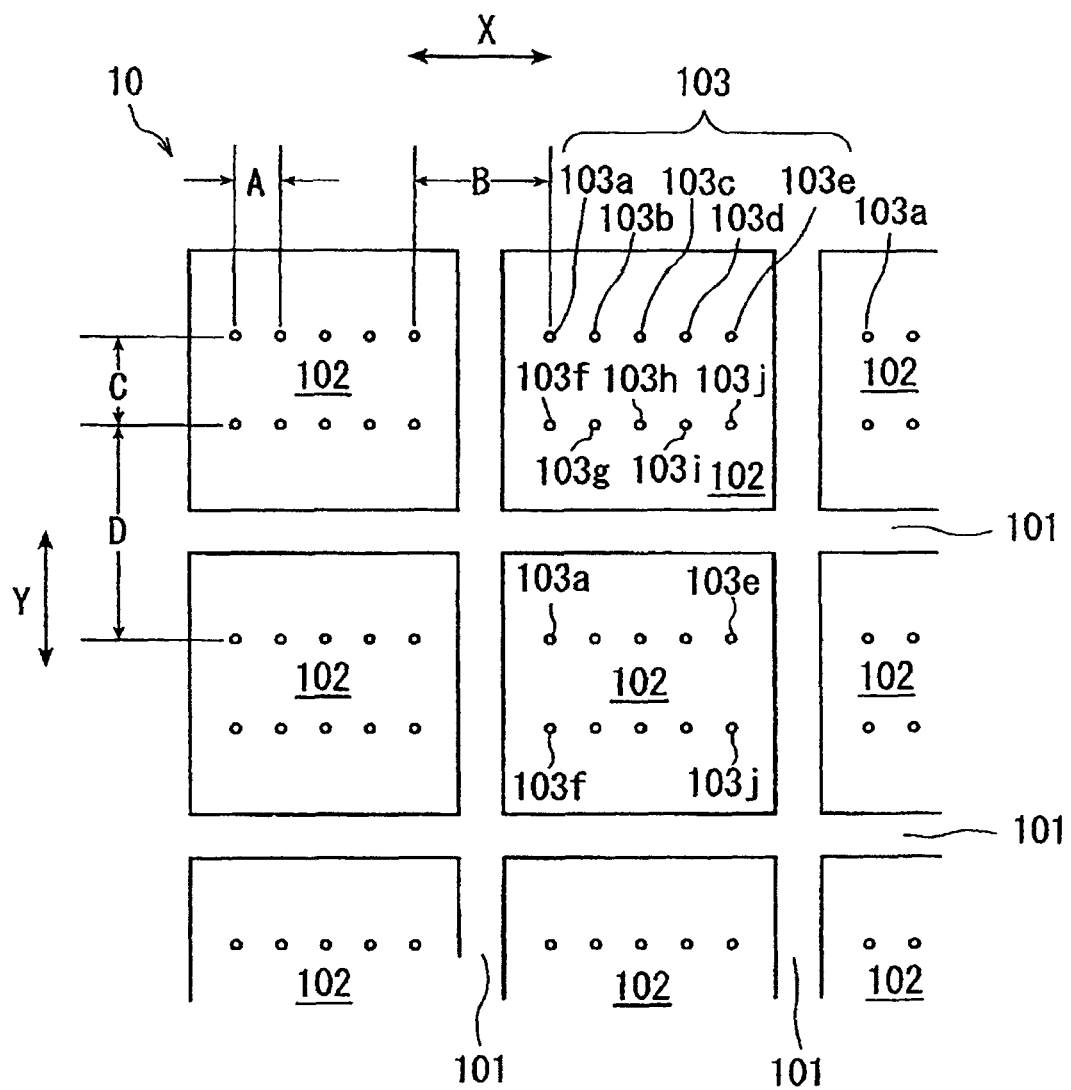
FIG. 7 is an enlarged plan view of a part of the silicon reservoir substrate shown in FIG. 6.

The operation of the laser processing apparatus configured above will now be described. FIG. 6 is a plan view of a silicon reservoir substrate 10 as the workpiece to be laser-processed. As shown in FIG. 6, a plurality of crossing division lines 101 are formed on the front side 10a of the silicon reservoir substrate 10, thereby partitioning a plurality of rectangular regions where a plurality of reservoir devices 102 are respectively formed. All of the reservoir devices 102 have the same configuration. As shown in FIG. 7, a plurality of hole forming areas 103 (103a to 103j) are formed on the front side of each reservoir device 102. Each of the hole forming areas 103 (103a to 103j) has a diameter of 15 μm, for example. In each reservoir device 102, the hole forming areas 103 (103a to 103j) are equally spaced at given intervals A in the X direction (horizontal direction as viewed in FIG. 7). More specifically, the spacing A between the hole forming areas 103a and 103b is equal to the spacing between the hole forming areas 103b and 103c, the spacing between the hole forming areas 103c and 103d, the spacing between the hole forming areas 103d and 103e, the spacing between the hole forming areas 103f and 103g, the spacing between the hole forming areas 103g and 103h, the spacing between the hole forming areas 103h and 103i, and the spacing between the hole forming areas 103i and 103j. Further, in the adjacent reservoir devices 102 opposed in the X direction with respect to the vertical division line 101, the adjacent hole forming areas 103 are equally spaced at given intervals B in the X direction. More specifically, the spacing B between the hole forming areas 103e and 103a in the adjacent reservoir devices 102 in the X direction is equal to the spacing between the hole forming areas 103j and 103f in the adjacent reservoir devices 102 in the X direction.

Further, in each reservoir device 102, the hole forming areas 103 (103a to 103j) are equally spaced at given intervals C in the Y direction (vertical direction as viewed in FIG. 7). More specifically, the spacing C between the hole forming areas 103a and 103f is equal to the spacing between the hole forming areas 103b and 103g, the spacing between the hole forming areas 103c and 103h, the spacing between the hole forming areas 103d and 103i, and the spacing between the hole forming areas 103e and 103j. Further, in the adjacent reservoir devices 102 opposed in the Y direction with respect to the horizontal division line 101, the adjacent hole forming areas 103 are equally spaced at given intervals D in the Y direction. More specifically, the spacing D between the hole forming areas 103f and 103a in the adjacent reservoir devices 102 in the Y direction is equal to the spacing between the hole forming areas 103g and 103b in the adjacent reservoir devices 102 in the Y direction, the spacing between the hole forming areas 103h and 103c in the adjacent reservoir devices 102 in the Y direction, the spacing between the hole forming areas 103i and 103d in the adjacent reservoir devices 102 in the Y direction, and the spacing between the hole forming areas 103j and 103e in the adjacent reservoir devices 102 in the Y direction. Referring to FIG. 6, symbols E1 to En denote the rows of the reservoir devices 102 formed on the front side 10a of the silicon reservoir substrate 10, and symbols F1 to Fn denote the columns of the reservoir devices 102, where n is the integer greater than 1. The number of reservoir devices 102 in each of the rows E1 to En and the columns F1 to Fn, the values of the spacings A, B, C, and D mentioned above, and the X and Y coordinate values for all the reservoir devices 102 are stored in the first memory area 83a of the random access memory (RAM) 83.

Figure 8A:
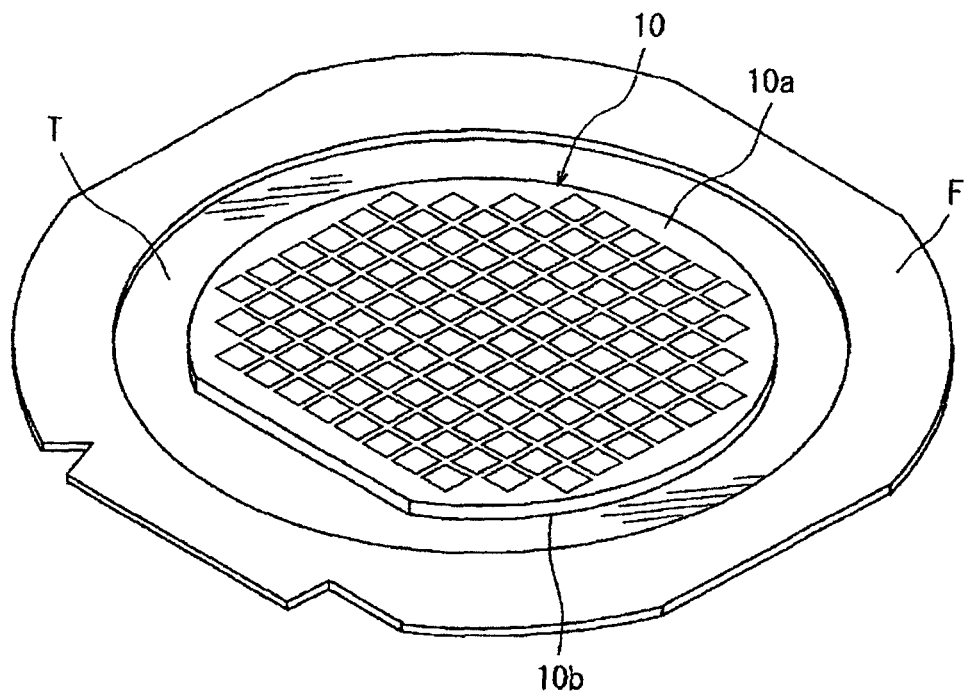
FIG. 8A is a perspective view showing a condition where the silicon reservoir substrate shown in FIG. 6 is attached to a protective tape supported to an annular frame.
Figure 8B:
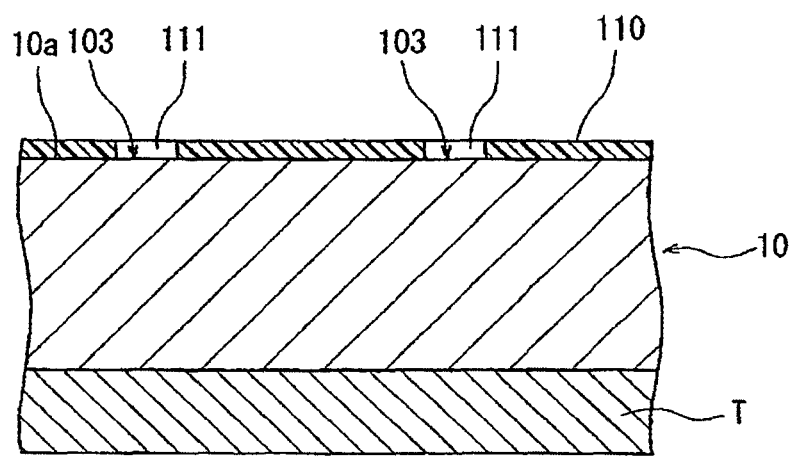
FIG. 8B is an enlarged sectional view of an essential part of the silicon reservoir substrate in the condition shown in FIG. 8A.

There will now be described an embodiment of a laser processing operation of processing the silicon reservoir substrate 10 by using the laser processing apparatus mentioned above to form a modified layer inside the silicon reservoir substrate 10 at the position corresponding to each of the hole forming areas 103 (103a to 103j) in each reservoir device 102. As shown in FIG. 8A, the silicon reservoir substrate 10 is supported through a protective tape T to an annular frame F in such a manner that the back side 10b of the silicon reservoir substrate 10 is attached to the protective tape T. The protective tape T is preliminarily supported at its outer circumferential portion to the annular frame F. The protective tape T is formed from a synthetic resin sheet such as a polyolefin sheet. Accordingly, the front side 10a of the silicon reservoir substrate 10 is oriented upward. As shown in FIG. 8B, the front side 10a of the silicon reservoir substrate 10 is covered with an etching mask 110 having a plurality of openings 111 respectively corresponding to the hole forming areas 103 (103a to 103j) of the reservoir devices 102 formed on the front side 10a of the silicon reservoir substrate 10. The silicon reservoir substrate 10 supported through the protective tape T to the annular frame F is placed on the chuck table 36 of the laser processing apparatus shown in FIG. 1 in the condition where the protective tape T comes into contact with the upper surface of the chuck table 36. Thereafter, the suction means not shown is operated to hold the silicon reservoir substrate 10 through the protective tape T on the chuck table 36 under suction. Accordingly, the silicon reservoir substrate 10 is held on the chuck table 36 in the condition where the front side 10a of the silicon reservoir substrate 10 is oriented upward. Further, the annular frame F is fixed by the clamps 362.

Thereafter, the feeding means 37 is operated to move the chuck table 36 holding the silicon reservoir substrate 10 to a position directly below the imaging means 7. In the condition where the chuck table 36 is positioned directly below the imaging means 7, the silicon reservoir substrate 10 on the chuck table 36 is set at the coordinate position shown in FIG. 9. In this condition, an alignment operation is performed to detect whether or not the crossing division lines 101 of the silicon reservoir substrate 10 held on the chuck table 36 are parallel to the X direction and the Y direction. That is, the imaging means 7 is operated to image the silicon reservoir substrate 10 held on the chuck table 36 and perform image processing such as pattern matching, thus performing the alignment operation.

Figure 9:
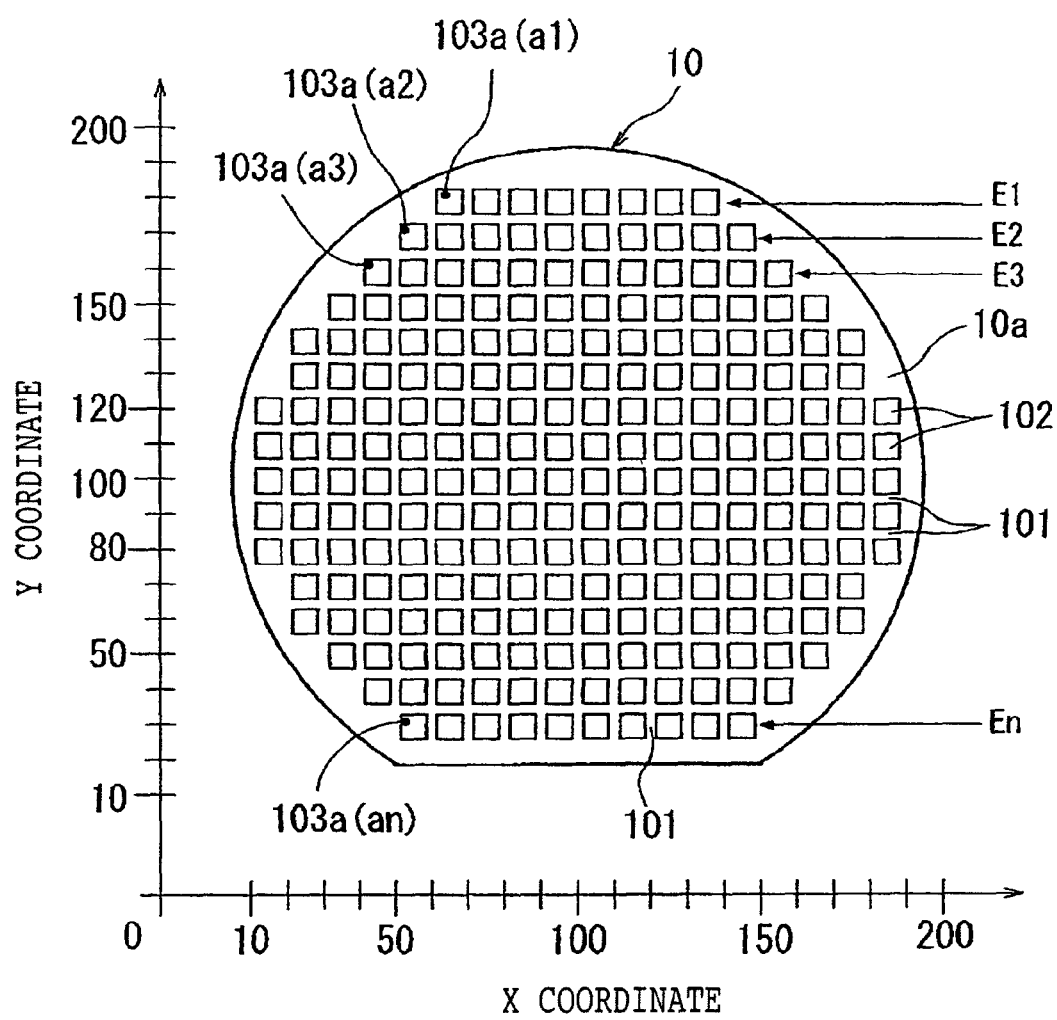
FIG. 9 is a plan view showing the relation between the silicon reservoir substrate shown in FIG. 6 and coordinates in the condition where the silicon reservoir substrate is held at a predetermined position on the chuck table of the laser processing apparatus shown in FIG. 1.

Thereafter, the chuck table 36 is moved to position the leftmost reservoir device 102 on the uppermost row E1, from among the reservoir devices 102 formed on the silicon reservoir substrate 10, as viewed in FIG. 9 directly below the imaging means 7. Further, the left upper hole forming area 103a of the hole forming areas 103 (103a to 103j) in this leftmost reservoir device 102 as viewed in FIG. 9 is positioned directly below the imaging means 7. In this condition, the hole forming area 103a is detected by the imaging means 7 and the coordinate value (a1) for the hole forming area 103a is sent as a first feed start position coordinate value to the control means 8. The control means 8 stores this coordinate value (a1) as the first feed start position coordinate value into the second memory area 83b of the random access memory (RAM) 83 (feed start position detecting step). The imaging means 7 and the focusing means 64 of the laser beam applying means 6 are spaced a predetermined distance in the X direction. Accordingly, the sum of the X coordinate value constituting the first feed start position coordinate value and the above predetermined distance between the imaging means 7 and the focusing means 64 is stored into the second memory area 83b of the RAM 83.

After detecting the first feed start position coordinate value (a1) in the leftmost reservoir device 102 on the uppermost row E1 as viewed in FIG. 9, the chuck table 36 is moved in the Y direction by the pitch of the reservoir devices 102 and also moved in the X direction to position the leftmost reservoir device 102 on the second uppermost row E2 as viewed in FIG. 9 directly below the imaging means 7. Further, the left upper hole forming area 103a of the hole forming areas 103 (103a to 103j) in this leftmost reservoir device 102 as viewed in FIG. 9 is positioned directly below the imaging means 7. In this condition, the hole forming area 103a is detected by the imaging means 7 and the coordinate value (a2) for the hole forming area 103a is sent as a second feed start position coordinate value to the control means 8. The control means 8 stores this coordinate value (a2) as the second feed start position coordinate value into the second memory area 83b of the random access memory (RAM) 83. As mentioned above, the imaging means 7 and the focusing means 64 of the laser beam applying means 6 are spaced a predetermined distance in the X direction. Accordingly, the sum of the X coordinate value constituting the second feed start position coordinate value and the above predetermined distance between the imaging means 7 and the focusing means 64 is stored into the second memory area 83b of the RAM 83. Thereafter, the control means 8 repeatedly performs the indexing operation (stepwise movement in the Y direction) and the feed start position detecting step mentioned above until the lowermost row En as viewed in FIG. 9 to detect the feed start position coordinate values (a3 to an) for the leftmost reservoir devices 102 on the other rows (E3 to En) and store these coordinate values into the second memory area 83b of the random access memory (RAM) 83.

Figure 10:
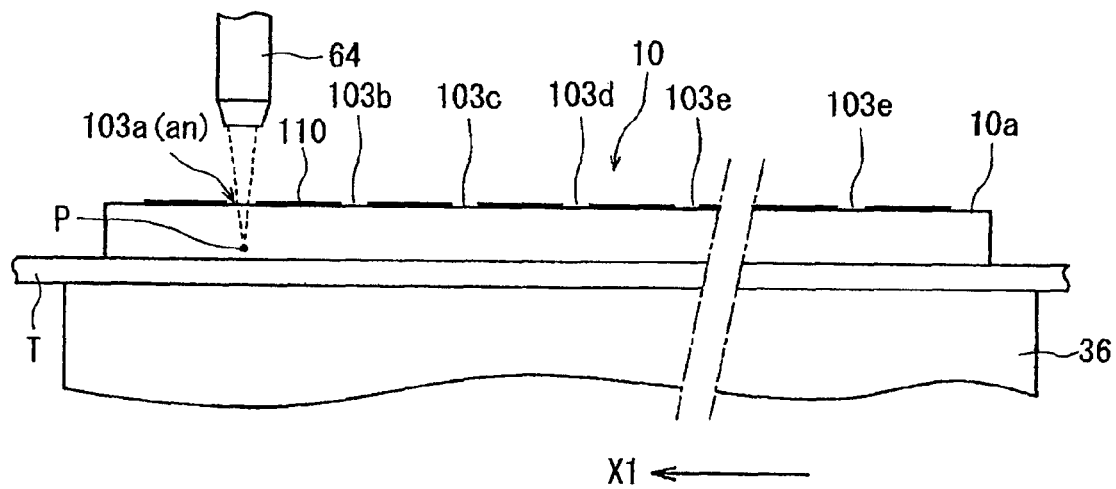
FIG. 10 is a partially cutaway sectional side view for illustrating a modified layer forming step to be performed to the silicon reservoir substrate shown in FIG. 6 by using the laser processing apparatus shown in FIG. 1.

Thereafter, a modified layer forming step is performed to form a modified layer inside the silicon reservoir substrate 10 at the position corresponding to each of the hole forming areas 103 (103a to 103j) set on each reservoir device 102. In this modified layer forming step, the feeding means 37 is first operated to move the chuck table 36 so that the hole forming area 103a corresponding to the first feed start position coordinate value (a1) stored in the second memory area 83b of the random access memory (RAM) 83 is positioned directly below the focusing means 64 of the laser beam applying means 6. FIG. 10 shows this condition where the hole forming area 103a corresponding to the first feed start position coordinate value (a1) is positioned directly below the focusing means 64. In the condition shown in FIG. 10, the control means 8 operates the focal position adjusting means 53 so that the focal point P of the pulsed laser beam to be applied from the focusing means 64 is set above the back side 10b of the silicon reservoir substrate 10 by a predetermined amount. Thereafter, the control means 8 applies an RF current to the piezoelectric motor 65 and operates the pulsed laser beam oscillating means 62. At the same time, the control means 8 controls the feeding means 37 to feed the chuck table 36 at a predetermined feed speed in the direction shown by an arrow X1 in FIG. 10 (modified layer forming step).

More specifically, the control means 8 controls the frequency and voltage of an RF current to be applied to the piezoelectric motor 65 in relation to the repetition frequency of the pulsed laser beam to be oscillated by the pulsed laser beam oscillating means 62 to move the focusing lens 641 of the focusing means 64 in the X direction by $\Delta x$ and in the Z direction by $\Delta z$ in feeding the chuck table 36 in the X direction (FIG. 10), thereby displacing the focal point of the pulsed laser beam to be focused by the focusing lens 641 in the thickness direction of a predetermined area of the silicon reservoir substrate 10 held on the chuck table 36.

Letting F (Hz) denote the repetition frequency of the pulsed laser beam to be oscillated by the pulsed laser beam oscillating means 62, H (Hz) denote the frequency of the RF current to be applied to the piezoelectric motor 65, J ($\mu$m) denote the amplitude of the oscillation of the piezoelectric motor 65 produced by the voltage to be applied to the piezoelectric motor 65, V ($\mu$m/s) denote the feed speed of the chuck table 36 to be fed by the feeding means 37, and h ($\mu$m) denote the thickness of the modified layer to be formed by one shot of the pulsed laser beam, the following conditions are satisfied in performing the modified layer forming step. The oscillation speed of the piezoelectric motor 65 is expressed as $(2 \times J \times H)$. Accordingly, the X component of this oscillation speed in the X direction is expressed as $(2 \times J \times H) \times \sin \alpha$. In order to apply the pulsed laser beam at the same X position, the X component $(2 \times J \times H) \times \sin \alpha$ of the oscillation speed of the piezoelectric motor 65 in the X direction must be set equal to the feed speed V of the chuck table 36. That is, the condition of $(2 \times J \times H) \times \sin \alpha = V$ must be satisfied. Further, the time spacing between one shot of the pulsed laser beam and the next shot of the pulsed laser beam is expressed as 1/F (sec). Accordingly, $\Delta x$ is equal to V/F. That is, $\Delta x = V/F$.

Further, the Z component of the oscillation speed of the piezoelectric motor 65 in the Z direction is expressed as $(2 \times J \times H) \times \cos \alpha$. Accordingly, the distance traveled by the piezoelectric motor 65 in the Z direction during 1/F (sec) is expressed as $(2 \times J \times H \times 1/F) \times \cos \alpha$, which must be set less than or equal to the thickness (h) of the modified layer by one shot in order to continuously form a plurality of modified layers in the thickness direction of the substrate 10 at the same X position. That is, the condition of $(2 \times J \times H \times 1/F) \times \cos \alpha \leq h$ must be satisfied. Further, $\Delta z$ is equal to $(2 \times J \times H \times 1/F) \times \cos \alpha$. That is, $\Delta z = (2 \times J \times H \times 1/F) \times \cos \alpha$.

Figure 11:
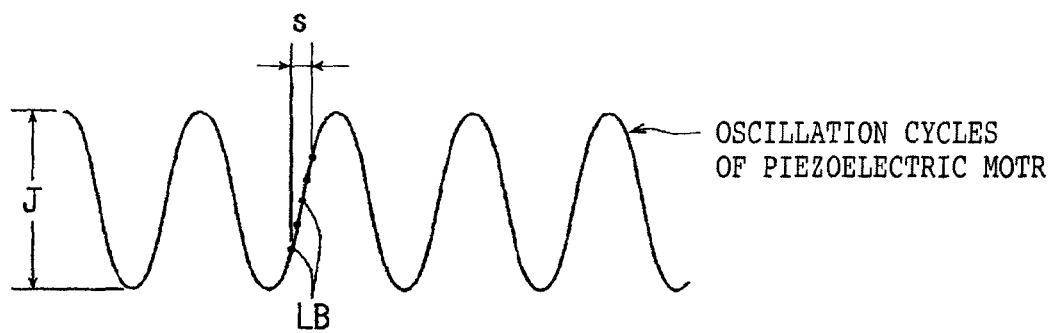
FIG. 11 is a diagram for illustrating the relation between the oscillation cycles of the piezoelectric motor configuring the laser beam applying means shown in FIG. 2 and the shots of the pulsed laser beam.

As shown in FIG. 11, a plurality of shots of the pulsed laser beam (LB) are applied during a period S when the focusing means 64 is displaced from a lower position to an upper position in each oscillation cycle of the piezoelectric motor 65. In the case of applying n (n≥2) shots of the pulsed laser beam (LB) during this period S, the frequency H (Hz) of the RF current to be applied to the piezoelectric motor 65 must be set sufficiently smaller than the repetition frequency F (Hz) of the pulsed laser beam. That is, the condition of $H \leq F/2n$ is set. Further, in the case that the spacing of the hole forming areas 103 (103a to 103j) in the X direction in each reservoir device 102 of the silicon reservoir substrate 10 is denoted by A as mentioned above, the frequency H (Hz) of the RF current to be applied to the piezoelectric motor 65 must be set equal to the feed cycles of the hole forming areas 103. That is, the condition of H=V/A is set.

Figure 12:
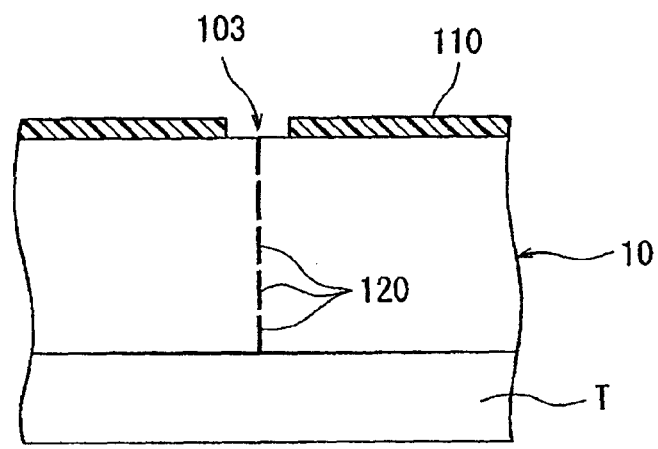
FIG. 12 is an enlarged sectional view of an essential part of the silicon reservoir substrate processed by the modified layer forming step shown in FIG. 10.

As a result, a plurality of modified layers 120 are continuously formed in the thickness direction of the silicon reservoir substrate 10 at the position corresponding to each of the hole forming areas 103 set in each reservoir device 102 as shown in FIG. 12. In FIG. 12, the plural modified layers 120 are spaced from each other for the convenience of illustration.

For example, the modified layer forming step is performed under the following processing conditions.

Wavelength of the laser beam: 1064 nm
Repetition frequency: 500 kHz
Average power: 0.3 W
Pulse width: 10 ps
Focused spot diameter: 1 μm
Feed speed: 300 mm/s At the start of the modified layer forming step, a voltage of 5 V is applied to the acoustooptic deflecting means 69 of the laser beam applying means 6. Accordingly, the pulsed laser beam oscillated by the pulsed laser beam oscillating means 62 is led to the direction changing mirror 63. Accordingly, the pulsed laser beam is applied through the focusing means 64 to the silicon reservoir substrate 10. When the period S (see FIG. 11) of displacement from the lower position to the upper position of the focusing means 64 in one oscillation cycle of the piezoelectric motor 65 has elapsed, the control means 8 applies a voltage of 0 V to the acoustooptic deflecting means 69. As a result, the acoustooptic deflecting means 69 leads the pulsed laser beam oscillated by the pulsed laser beam oscillating means 62 to the laser beam absorbing means 68. Thereafter, when the lower position of the focusing means 64 is reached in the next oscillation cycle of the piezoelectric motor 65, a voltage of 5 V is applied again to the acoustooptic deflecting means 69 and continues to be applied during the period S of displacement from the lower position to the upper position of the focusing means 64 in this oscillation cycle of the piezoelectric motor 65. In this manner, the control of applying the voltage of 5 V to the acoustooptic deflecting means 69 during the period S of displacement from the lower position to the upper position of the focusing means 64 in each oscillation cycle of the piezoelectric motor 65 and the control of applying the voltage of 0 V to the acoustooptic deflecting means 69 during the period other than the period S in each oscillation cycle of the piezoelectric motor 65 are repeatedly performed. When the application of the pulsed laser beam is performed to the hole forming area 103j set in this reservoir device 102, the voltage of 0 V is applied to the acoustooptic deflecting means 69 to thereby lead the pulsed laser beam oscillated by the pulsed laser beam oscillating means 62 to the laser beam absorbing means 68. Thereafter, the control of applying the voltage of 5 V to the acoustooptic deflecting means 69 during the period S and the control of applying the voltage of 0 V to the acoustooptic deflecting means 69 during the period other than the period S are repeatedly performed in the hole forming areas 103 (103a to 103j) set in each reservoir device 102 of the silicon reservoir substrate 10. Finally, this control is performed to the hole forming areas 103 (103a to 103j) set in the rightmost reservoir device 102 on the lowermost row En as viewed in FIG. 6.

In the modified layer forming step mentioned above, the frequency and voltage of an RF current to be applied to the piezoelectric motor 65 are controlled in relation to the repetition frequency of the pulsed laser beam to move the focusing lens 641 of the focusing means 64 in the X direction by $\Delta x$ and in the Z direction by $\Delta z$ in feeding the chuck table 36 in the X direction, thereby displacing the focal point of the pulsed laser beam to be focused by the focusing means 641 in the thickness direction of a predetermined area of the silicon reservoir substrate 10 held on the chuck table 36. Accordingly, the plural modified layers 120 can be formed in the thickness direction of the silicon reservoir substrate 10 at the position corresponding to each of the hole forming areas 103 set in each reservoir device 102 as shown in FIG. 12. As a result, the plural modified layers can be efficiently stacked at each of the hole forming areas 103 set in each reservoir device 102 of the silicon reservoir substrate 10, thereby improving the productivity.

There will now be described another preferred embodiment of the conditions in performing the modified layer forming step in the case that F (Hz) is the repetition frequency of the pulsed laser beam to be oscillated by the pulsed laser beam oscillating means 62, H (Hz) is the frequency of the RF current to be applied to the piezoelectric motor 65, J (μm) is the amplitude of the oscillation of the piezoelectric motor 65 produced by the voltage to be applied to the piezoelectric motor 65, V (μm/s) is the feed speed of the chuck table 36 to be fed by the feeding means 37, and h (μm) is the thickness of the modified layer to be formed by one shot of the pulsed laser beam.

Figure 13A:
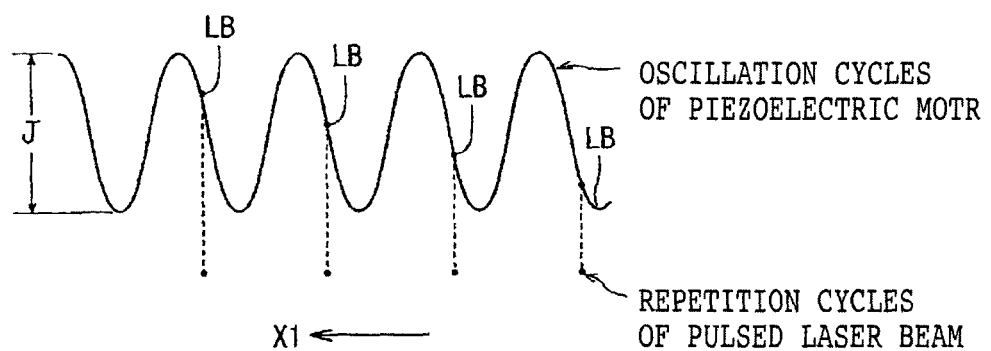
FIGS. 13A and 13B are diagrams for illustrating the relation between the oscillation cycles of the piezoelectric motor configuring the laser beam applying means shown in FIG. 2 and the shots of the pulsed laser beam in another preferred embodiment.
Figure 13B:
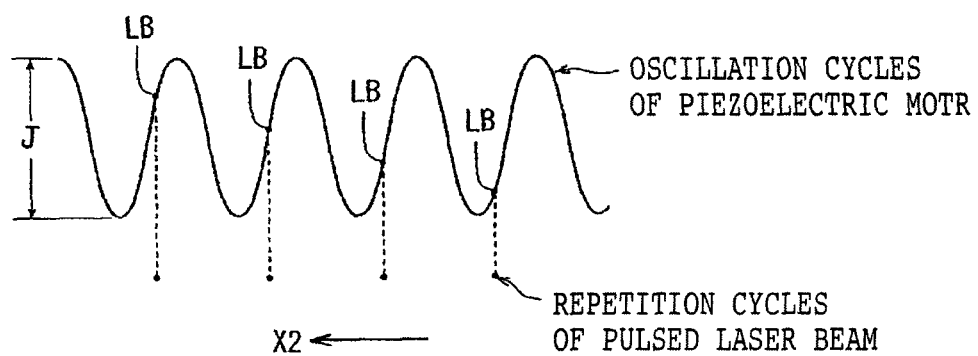

In this preferred embodiment, one shot of the pulsed laser beam (LB) is applied during the period S of displacement from the lower position to the upper position of the focusing means 64 in each oscillation cycle of the piezoelectric motor 65 with a slight phase shift as shown in FIGS. 13A and 13B. In the case of applying n (n≥2) shots of the pulsed laser beam during this period S, the following conditions are satisfied.

There is a phase shift between F and H in the range not exceeding (360°/2n). In the case of moving the chuck table 36 holding the silicon reservoir substrate 10 from the side where the piezoelectric motor 65 is located, i.e., in the direction shown by an arrow X1 in FIG. 13A, the condition of $F/(1+\frac{1}{2}n) H$ is set except F=H. In the case of moving the chuck table 36 holding the silicon reservoir substrate 10 from the side opposite to the side where the piezoelectric motor 65 is located, i.e., in the direction shown by an arrow X2 in FIG. 13B, the condition of $H \leq F/(1-\frac{1}{2}n)$ is set.

After forming the plural modified layers inside the silicon reservoir substrate 10 in the thickness direction thereof at the position corresponding to each of the hole forming areas 103 set in each reservoir device 102 as mentioned above, the silicon reservoir substrate 10 is subjected to an etching step of etching each hole forming area 103 to form a through hole.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:
   a chuck table for holding a workpiece;
   laser beam applying means for applying a pulsed laser beam having a transmission wavelength to said workpiece held on said chuck table;
   feeding means for relatively moving said chuck table and said laser beam applying means in a feeding direction (X direction);
   X position detecting means for detecting the X position of said chuck table fed by said feeding means; and
   control means for controlling said laser beam applying means according to a detection signal from said X position detecting means;
   said laser beam applying means including pulsed laser beam oscillating means for oscillating said pulsed laser beam, focusing means having a focusing lens for focusing said pulsed laser beam oscillated by said pulsed laser beam oscillating means and applying said pulsed laser beam to said workpiece held on said chuck table, and a piezoelectric motor for displacing said focusing means in a direction inclined at a predetermined angle ($\alpha$) with respect to the optical axis of said focusing lens (Z direction);
   said control means controlling the frequency and voltage of an RF current to be applied to said piezoelectric motor in relation to the repetition frequency of said pulsed laser beam to move said focusing means in said X direction by $\Delta x$ and in said Z direction by $\Delta z$ in feeding said chuck table in said X direction, thereby displacing the focal point of said pulsed laser beam to be focused by said focusing lens in the thickness direction of a predetermined area of said workpiece held on said chuck table.

2. The laser processing apparatus according to claim 1, wherein the conditions of $(2 \times J \times H) \times \sin \alpha = V$, $\Delta x = V/F$, $(2 \times J \times H \times 1/F) \times \cos \alpha \leq h$, and $\Delta z = (2 \times J \times H \times 1/F) \times \cos \alpha$ are satisfied; where F (Hz) is the repetition frequency of said pulsed laser beam to be oscillated by said pulsed laser beam oscillating means, H (Hz) is the frequency of said RF current to be applied to said piezoelectric motor, J ($\mu$m) is the amplitude of the oscillation of said piezoelectric motor produced by the voltage to be applied to said piezoelectric motor, V ($\mu$m/s) is the feed speed of said chuck table to be fed by said feeding means, and h ($\mu$m) is the thickness of a modified layer to be formed by one shot of said pulsed laser beam.

3. The laser processing apparatus according to claim 2, wherein the condition of $H \leq F/2n$ is set in the case of applying n ($n \geq 2$) shots of said pulsed laser beam during the period of displacement from a lower position to an upper position of said focusing means in each oscillation cycle of said piezoelectric motor.

4. The laser processing apparatus according to claim 3, wherein the condition of $H = V/A$ is set, where A is the spacing of subject areas in said workpiece to be processed.

* * * * *